United States Patent
Sim et al.

(10) Patent No.: US 10,699,686 B2
(45) Date of Patent: Jun. 30, 2020

(54) SOUND-PERMEABLE METAL PLATE AND SOUND-ABSORBING COMPOSITE PLATE USING SAME

(71) Applicants: Hyundai Motor Company, Seoul (KR); Kia Motors Corporation, Seoul (KR); NVH KOREA, INC., Ulsan (KR)

(72) Inventors: Jae Gi Sim, Seoul (KR); Jong Hyun Ryu, Ansan-si (KR)

(73) Assignees: Hyundai Motor Company, Seoul (KR); Kia Motors Corporation, Seoul (KR); NVH KOREA, INC., Ulsan (KR)

( * ) Notice: Subject to any disclaimer, the term of this patent is extended or adjusted under 35 U.S.C. 154(b) by 345 days.

(21) Appl. No.: 15/807,349

(22) Filed: Nov. 8, 2017

(65) Prior Publication Data

US 2018/0301133 A1 Oct. 18, 2018

(30) Foreign Application Priority Data

Apr. 13, 2017 (KR) .......................... 10-2017-0047697

(51) Int. Cl.
| | | |
|---|---|---|
| *G10K 11/168* | (2006.01) | |
| *B32B 3/26* | (2006.01) | |
| *B32B 3/28* | (2006.01) | |
| *B32B 15/14* | (2006.01) | |
| *B32B 15/20* | (2006.01) | |
| *G10K 11/172* | (2006.01) | |
| *B60R 13/08* | (2006.01) | |

(52) U.S. Cl.
CPC ............ *G10K 11/168* (2013.01); *B32B 3/266* (2013.01); *B32B 3/28* (2013.01); *B32B 15/14* (2013.01); *B32B 15/20* (2013.01); *G10K 11/172* (2013.01); *B32B 2250/02* (2013.01); *B32B 2262/062* (2013.01); *B32B 2307/102* (2013.01); *B60R 13/0838* (2013.01)

(58) Field of Classification Search
CPC ........... B32B 3/266; B32B 3/28; B32B 15/14; B32B 15/20; B32B 2250/02; B32B 2307/102; B32B 2262/062; G10K 11/172; B60R 13/0838
USPC ................................ 181/290, 284, 288, 292
See application file for complete search history.

(56) References Cited

U.S. PATENT DOCUMENTS 2,771,164 A * 11/1956 Scurlock ................. E04C 2/326
  52/404.1
3,074,339 A * 1/1963 Pennati ..................... F24F 7/10
  454/296

(Continued)

FOREIGN PATENT DOCUMENTS

KR 10-2010-0103707 A 9/2010

*Primary Examiner* — Forrest M Phillips
(74) *Attorney, Agent, or Firm* — Morgan, Lewis & Bockius LLP

(57) ABSTRACT

A sound-permeable metal plate, which is a plate processed to have concavity and convexity formed thereon, may include: a plurality of cells protruding from the plate; and a flat base portion formed between the plurality of cells, wherein each of the cells includes a plurality of wall surface parts, which are bent on and protrude from the base portion, and a cover portion extending from end portions of the wall surface parts, and each of the cells has a straight line-shaped slit formed through the plate.

9 Claims, 6 Drawing Sheets

(56) References Cited

U.S. PATENT DOCUMENTS

| | | | | |
|---|---|---|---|---|
| 6,021,612 | A * | 2/2000 | Dunn | E01F 8/007 |
| | | | | 181/286 |
| 6,555,246 | B1 * | 4/2003 | Zwick | F01N 13/14 |
| | | | | 181/290 |
| 6,708,626 | B2 * | 3/2004 | Ueda | B61D 17/08 |
| | | | | 105/422 |
| 6,821,607 | B2 * | 11/2004 | Zwick | B32B 3/28 |
| | | | | 181/290 |
| 2002/0036115 | A1 * | 3/2002 | Wilson | B32B 3/20 |
| | | | | 181/292 |
| 2008/0223655 | A1 * | 9/2008 | Peiffer | F02C 7/045 |
| | | | | 181/292 |
| 2014/0060965 | A1 * | 3/2014 | Polonen | B32B 5/02 |
| | | | | 181/292 |
| 2019/0108826 | A1 * | 4/2019 | Henderson | G10K 11/168 |

\* cited by examiner

SOUND-PERMEABLE METAL PLATE AND SOUND-ABSORBING COMPOSITE PLATE USING SAME

CROSS REFERENCE TO RELATED APPLICATION

The present application claims priority to Korean Patent Application No. 10-2017-0047697, filed Apr. 13, 2017, the entire contents of which is incorporated herein for all purposes by this reference.

BACKGROUND OF THE INVENTION

Field of the Invention

The present invention relates to a sound-permeable metal plate and a sound-absorbing composite plate using the same and, more specifically, to a plate including a metal material having high sound permeability and a composite plate manufactured by adding a sound-absorbing material to the same and having excellent sound absorptivity.

Description of Related Art

A kind of heat shield is disposed around an engine of an automobile to shield heat thereof and a sound-absorbing material surrounds the heat shield to absorb noise. An aluminum plate having excellent heat reflectivity is used as the heat shield, and felt weaved using fibers, normally a cotton fiber, is used as the sound-absorbing material.

However, when an aluminum plate having a plain or rigidity-reinforcing pattern is used as a heat shield without any modifications, engine noise does not pass through the plate and is thus amplified while echoing inside the plate.

Therefore, to solve such a problem, a technology, which forms perforations randomly distributed on a plate and then molds a rigidity-reinforcing pattern on the plate, to use the plate as a heat shield, has been proposed.

However, when the above process is applied, the process requires a long time. Further, the perforations having a predetermined shape are not enough to effectively discharge internal noise and have thus a limitation in improving sound absorptivity.

Therefore, a plate, which can be manufactured through a simple process and has high sound permeability, and a composite plate, which is made by mounting a sound-absorbing material to the plate and can thus have a high sound absorption rate, are required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a sound-permeable plate having high sound permeability and a simple process, and a composite plate manufactured using the same and having excellent sound absorptivity.

To achieve the above aspect, a sound-permeable metal plate according to an exemplary embodiment of the present invention may be a plate processed to have concavity and convexity formed thereon and may include: a plurality of cells protruding from the plate; and a flat base portion formed between the plurality of cells, wherein each of the cells includes a plurality of wall surface parts, which are bent on and protrude from the base portion, and a cover portion extending from end portions of the wall surface parts, and each of the cells has a straight line-shaped slit formed through the plate.

The cover portion may be formed to be a polygon having edge portions, the number of which is equal to the number of the plurality of wall surface parts configuring each of the cells, and the slit is formed along at least one of the plurality of edge portions.

The plurality of wall surface parts configuring each of the cells may be integrally formed to have a shape of a frustum of a polygonal pyramid, in which the farther the wall surface parts are away from the base portion, the closer to each other the wall surface parts become.

The slit may be formed along at most half of edge portions of the cover part.

The height from the base portion to the cover portion may be at least 25% of the largest width of the bottom surface of each of the cells.

In a view oriented perpendicularly to a reference plane in which the base portion is placed, the slit may have an area occupying at least 5% of the area of the bottom surface of each of the cells.

In a view oriented perpendicularly to a reference plane in which the base portion is placed, the cover portion may have an area occupying at least 30% of the area of the bottom surface of each of the cells.

The plate may include an aluminum material.

Meanwhile, a sound-absorbing composite plate according to an exemplary embodiment of the present invention may include: a sound-permeable metal plate which includes a plurality of cells protruding therefrom and a flat base portion formed between the plurality of cells; and a sound-absorbing material disposed on one surface side of the sound-permeable metal plate, wherein each of the cells includes a plurality of wall surface parts, which are bent on and protrude from the base portion, and a cover portion extending from end portions of the wall surface parts, and each of the cells has a straight line-shaped slit formed through the plate.

The sound-permeable metal plate may include an aluminum material and the sound-absorbing material may include felt including a fiber.

The present invention can provide a sound-permeable metal plate and a sound-absorbing composite plate using the same, wherein the sound-permeable metal plate reflects radiant heat to shield heat and makes sound pass therethrough, and the sound-absorbing composite plate includes a lamination of the metal plate and a sound-absorbing material having a sound absorption effect, and thus has a high heat-shielding performance and high sound-absorbing performance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
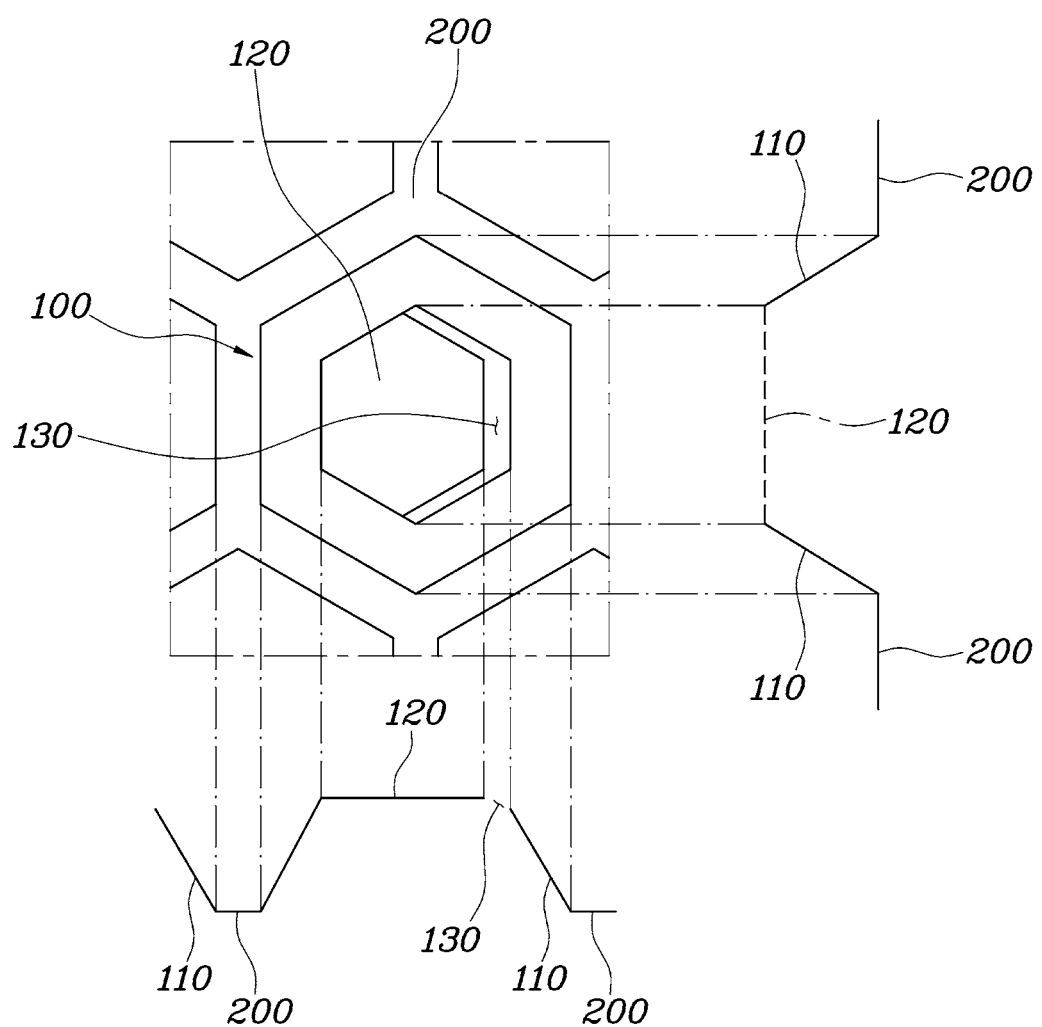
FIG. 1 is a top plane view and a cross-sectional view of a sound-permeable metal plate according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is merely for the purpose of describing particular embodiments and is not intended to limit the scope of the present invention. Singular forms used herein may include plural forms as well unless the context clearly indicates otherwise. The meaning of "including" used herein specifies a particular characteristic, region, integer, step, operation, element, and/or component but does not exclude the existence or addition of another particular characteristic, region, integer, step, operation, element, component, and/or a group thereof.

Unless defined otherwise, all terms used herein, including technical and scientific terms, have the same meanings as those generally understood by a person skilled in the art to which the present invention pertains. Such terms as those defined in a generally used dictionary may be interpreted to have the meanings conforming to the related art document and the presently disclosed content, and are not to be interpreted as having ideal or excessively formal meanings unless clearly defined in the present invention.

Hereinafter, a sound-permeable metal plate and a sound-absorbing composite plate using the same according to an exemplary embodiment of the present invention will be described with reference to the accompanying drawings.

Figure 2:
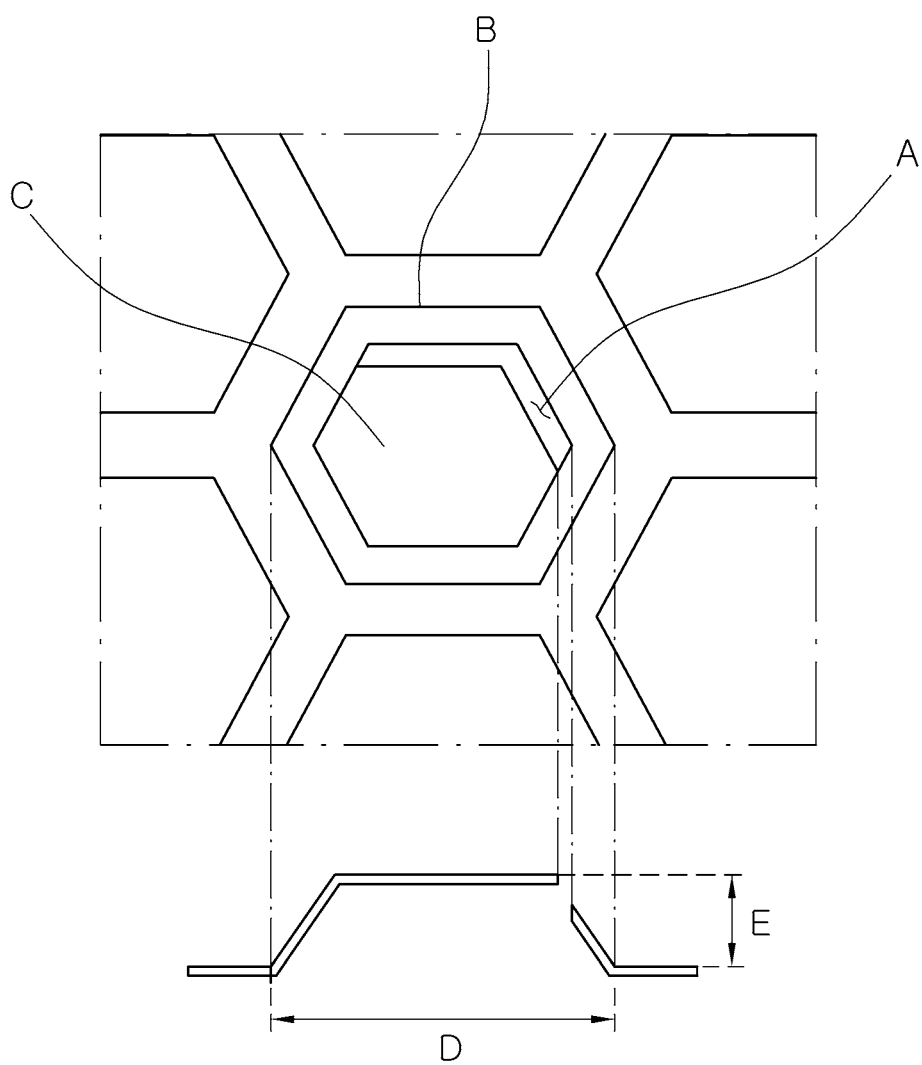
FIG. 2 a schematic view for describing a relative surface area according to the position of a sound-permeable metal plate according to an exemplary embodiment of the present invention.

As illustrated in FIG. 1 and FIG. 2, a sound-permeable metal plate according to an exemplary embodiment of the present invention is a concavo-convex plate having concavity and convexity formed by pressing or roll-processing an original plate including an aluminum material, and includes a cell 100 and a base portion 200. Here, the cell 100 is an area which protrudes from the plate and the base portion 200 is a flat area which maintains an original shape of the plate.

More describing the shape of the cell 100, the cell 100 is formed to have a shape of a frustum of a hexagonal pyramid, the frustum being made by chopping off the top portion of a hexagonal pyramid having a hexagonal base and a cross section which becomes narrower as the height thereof becomes higher.

In drawings according to an exemplary embodiment of the present invention, the cell 100 is illustrated in a shape of a frustum of a hexagonal pyramid having a hexagonal base. However, the present invention is not limited thereto and may be formed in a shape of a frustum of a polygonal pyramid having various base shapes including a triangle, a quadrangle, or a pentagon.

When the cell 100 are formed in a shape of a frustum of a polygonal pyramid, the base of which has a shape of one of a triangle, a quadrangle, and a pentagon, the cell 100 may be most densely disposed on the plate.

The cell 100 may include a plurality of wall surface parts 110, which are bent on the base portion 200 and integrally configure a wall surface of the cell 100; and a cover portion 120 which extends from upper end portions of the wall surface parts 110 to cover the upper surface of the cell 100, wherein a slit 130, which is a kind of a sound permeation hole extending through the plate, is formed in a boundary area between the cover portion 120 and the wall surface parts 110.

The number of the wall surface parts 110 may vary according to the shape of the bottom surface of the cell 100. An exemplary embodiment of the present invention illustrates six wall surface parts 110 disposed to configure a wall surface of the cell 100 having a shape of a frustum of a hexagonal pyramid.

The cover portion 120 may be formed to be a polygon having edge portions, the number of which is equal to that of bottom edge portions of the cell 100, and may be disposed so that the edge portions are in contact with upper end portions of the wall surface parts 110, respectively.

The slit 130 may be formed on the cover portion 120 or in a boundary area in which the cover portion 120 and each of the wall surface parts 110 are in contact with each other. For example, a straight line-shape slit 130 may be formed along at least one of edge portions of the cover portion 120.

When the slit 130 is formed in a shape of straight line, noise can easily pass through the slit 130 or can disappear while being reflected from an area between the wall surface parts 110 and the cover portion 120.

Further, with reference to the number of edge portions of the cover portion 120, that is, the number of the bottom edge portions of the cell 100 or the number of the wall surface parts 110, the slit 130 may be formed along at most half of the edge portions.

For example, when the cover portion 120 has six edge portions, the slit 130 may be formed along at most three edge portions.

, when the slit 130 becomes larger, that is, when the slit 130 is formed along a larger number of edge portions of the cover portion 120, sound permeability is improved while durability is degraded. To have sound permeation performance, the slit 130 is required to be formed along at least one of the edge portions of the cover portion 120. In the case of a cover portion 120 having a slit 130 consecutively formed along edge portions over half of the edge portions of the cover portion 120, when a plate according to an exemplary embodiment of the present invention is molded in a desired shape including a heat shield shape, a crack may grow from the slit 130 to break the plate.

Examining the shape of the cell 100 from another aspect, the height of the cell 100 may be formed to have a length of at least 25% of the largest width of a surface configured by the bottom edge portions of the cell 100.

For the slit 130 to be formed during pressing or roll-processing, the height of the cell 100 is required to be controlled in the above-described range in consideration of the elongation of aluminum which is a material of the plate. When the height of the cell 100 is under 25% of the largest width of the bottom surface of the cell 100, the slit 130 may not be formed through the plate during processing.

The area of the slit 130 may vary according to a viewpoint from which the slit 130 is seen. However, when the slit 130 is seen from above, that is, in a view oriented perpendicularly to the base portion 200, the slit 130 may have an area occupying at least 5% of the area of the bottom surface of the cell 100.

When the area of the slit 130 is less than 5% of the area of the bottom surface of the cell 100, sufficient sound permeability cannot be secured.

Further, in a view oriented perpendicularly to the base portion 200, the cover portion 120 may have an area occupying at least 30% of the area of the bottom surface of the cell 100.

For the plate to exhibit a heat-shielding effect as a heat shield, the area of the slit 130 is required to be controlled to be equal to or smaller than a predetermined range. To the present end, the area of the cover portion 120 is required to be limited to the above-mentioned range. When the area of the cover portion 120 is under 30% of the area of the bottom surface of the cell 100, heat passes through the plate, making it impossible that the plate is configured as a heat shield.

Figure 3:
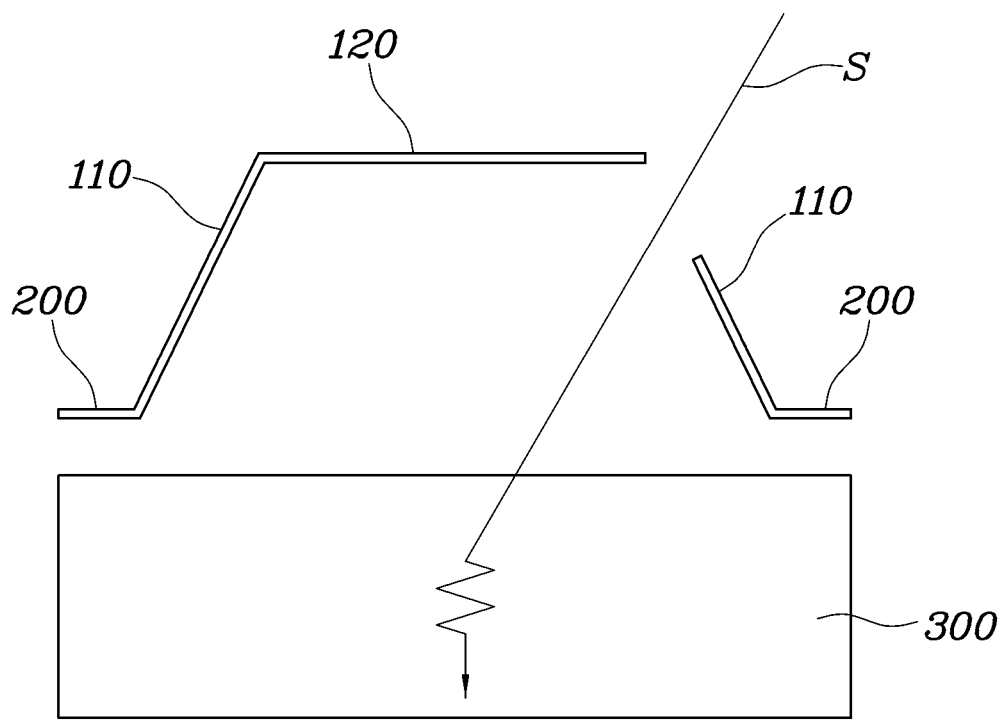
FIG. 3 is a cross-sectional view of a sound-absorbing composite plate according to an exemplary embodiment of the present invention.
Figure 4A:
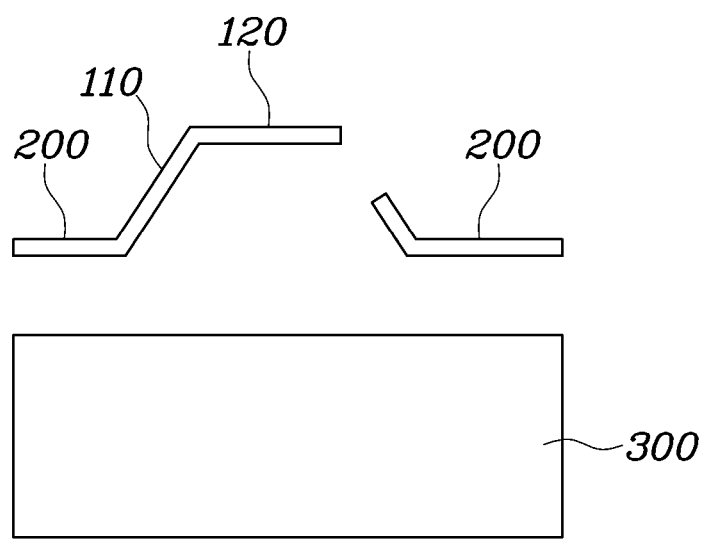
FIG. 4A, FIG. 4B, FIG. 4C, and FIG. 4D are cross-sectional views of several embodiments according to present invention and of comparative examples compared with the embodiments.
Figure 4B:
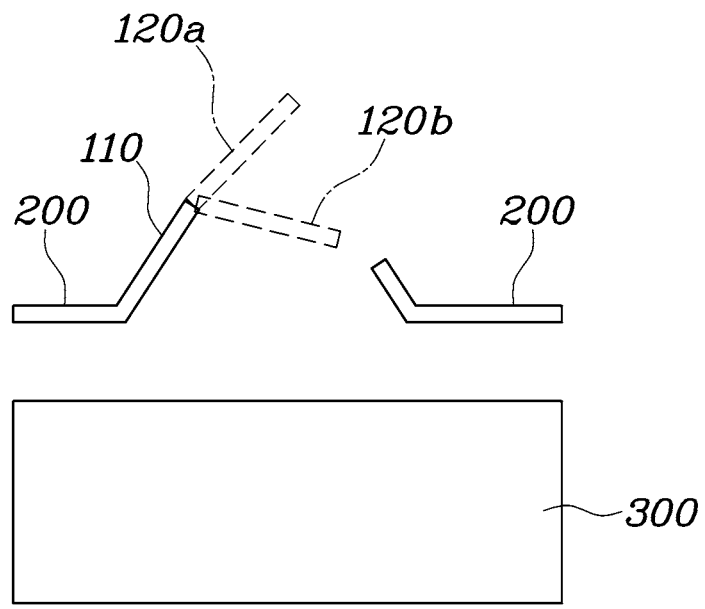
Figure 4C:
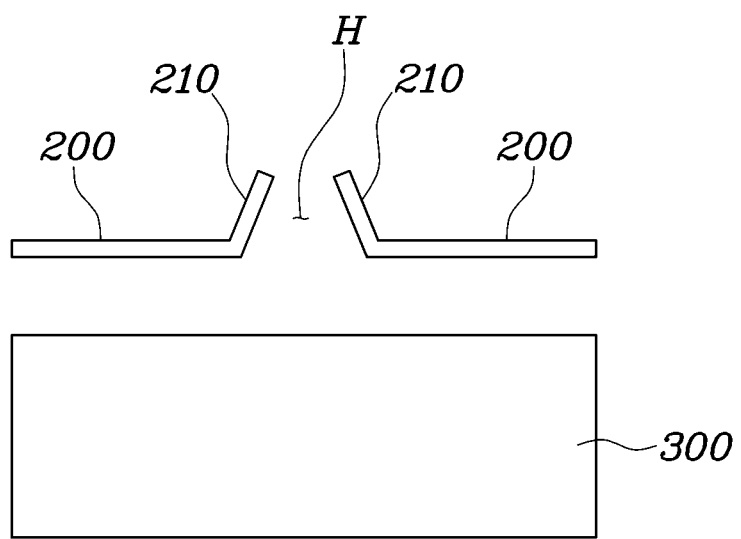
Figure 4D:
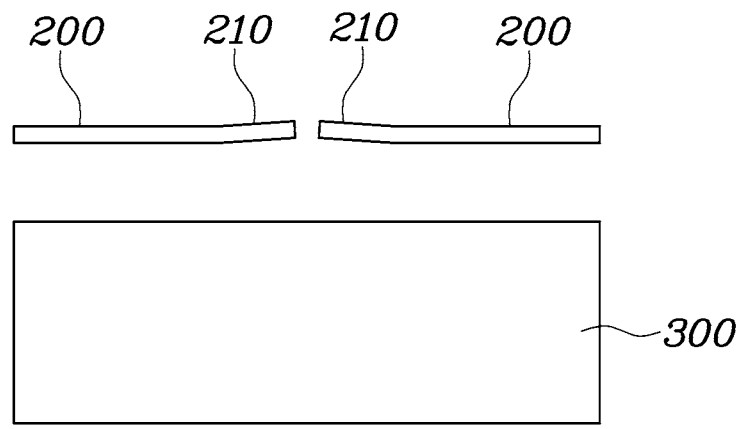

As illustrated in FIGS. 1 to 3, a sound-absorbing composite plate according to an exemplary embodiment of the present invention is configured by laminating the above-described sound-permeable metal plate and a sound-absorbing material 300. Here, the sound-absorbing material is configured by felt weaved using a fiber, preferably, a cotton fiber.

When the sound-absorbing composite plate is, as described above, configured by laminating the above-described sound-permeable metal plate and the sound-absorbing material 300, the sound-absorbing material 300 can absorb noise S when the noise S passes through the slit 130. Therefore, noise transferred to the outside can be reduced.

The sound-permeable metal plate has been described above, and thus, herein, a description thereof will be omitted.

Figure 5:
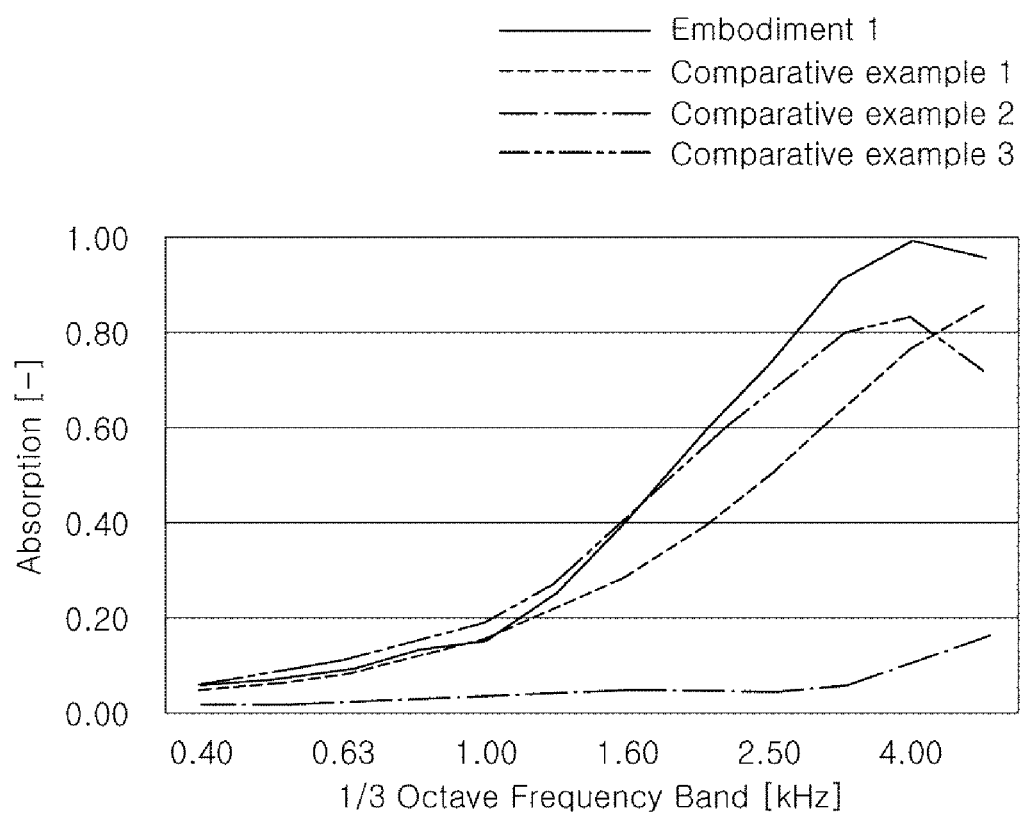
FIG. 5 is a graph showing a sound absorption rate for each frequency band in an exemplary embodiment of the present invention and comparative examples compared with the embodiment.
Figure 6:
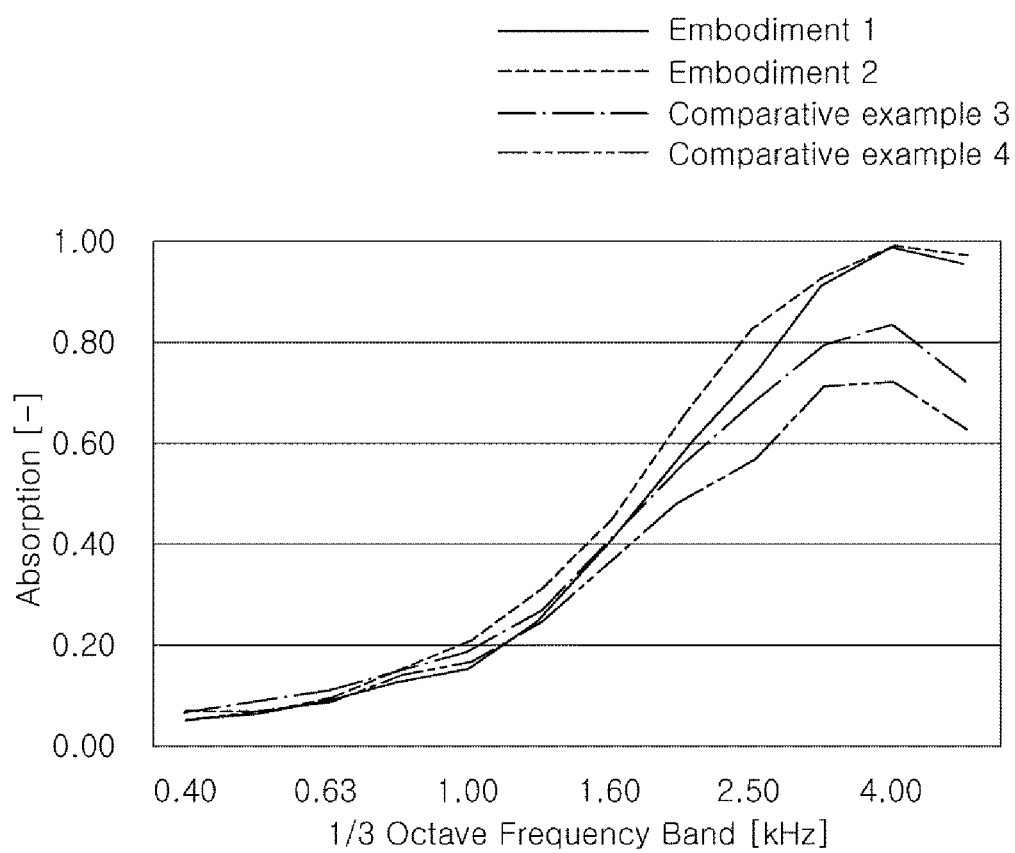
FIG. 6 is a graph showing a sound absorption rate for each frequency band in several embodiments according to an exemplary embodiment of the present invention and comparative examples compared with the embodiments.

FIGS. 4 to 6 illustrate the shapes and physical properties of embodiments of the present invention and of comparative examples compared with the embodiments.

As illustrated in FIGS. 4A to 4D, embodiment 1(a) relates to a composite plate including the sound-absorbing material 300 and the sound-permeable metal plate having a cell which has a shape of a frustum of a hexagonal pyramid, described in FIGS. 1 to 3. Embodiment 2(b) relates to a composite plate that is obtained by molding the plate of embodiment 1 (a) in a desired shape and has cover plates 120a and 120b randomly deformed after the molding of the plate of embodiment 1(a). Comparative example 3(c) relates to a composite plate including the sound-absorbing material 300 and a metal plate having burrs 210 formed therein while forming a perforation H on the base portion 200. Comparative example 4 (d) relates to a composite plate that is obtained by molding the plate of embodiment 3 (c) in a desired shape and has a perforation H, which is blocked by burrs 210 after the molding of the plate of comparative example 3 (c) and thus has a smaller size.

Although not illustrated, comparative example 1 relates to a sound-absorbing material and comparative example 2 relates to a composite material including a sound-absorbing material and a metal plate having no perforation or slit formed therethrough.

All metal plates applied to embodiments 1 and 2 and comparative examples 1 to 4 described above are aluminum plates having a thickness of 125 μm, and all sound-absorbing materials applied thereto are felt made of recycled cotton fibers and have a density of 1000 g/m² and a thick of 10 mm.

FIGS. 5 and 6 illustrate the sound absorption rates of embodiments and comparative examples.

As illustrated in FIG. 5, it can be understood that embodiment 1 according to an exemplary embodiment of the present invention, that is, a composite plate including a sound-permeable metal plate and a sound-absorbing material has, in particular, an excellent sound absorption rate in a high frequency band.

Comparative example 1 relates to a sound-absorbing material and shows that the sound-absorbing material has a lower sound absorption rate than exemplary embodiment 1 in intermediate and high frequency bands as well as that a pure sound-absorbing material cannot achieve a heat shielding effect as a heat shield.

It can be understood that comparative example 2 relates to a composite plate including a sound-absorbing material and a metal plate having no perforation and slit formed therethrough and shows that the composite plate has a very low sound absorption rate in all frequency bands. This is because the metal plate does not allow sound to pass therethrough but reflects the sound and thus causes a kind of resonance phenomenon to amplify noise.

Comparative example 3 relates to a composite plate including a sound-absorbing material and a metal plate having a perforation formed therethrough, and shows that the composite plate has a sound absorption rate similar to that of embodiment 1 in low and intermediate frequency bands but has a sound absorption rate lower than that of embodiment 1 in intermediate and high frequency bands. An unpleasant feeling transferred to a person varies according to the frequency of noise. High-frequency noise is inclined to transfer a more unpleasant feeling to a person. In the instant case, comparative example 3, which has a low sound absorption rate in the high-frequency band, has low noise absorption efficiency.

As illustrated in FIGS. 4 and 6, in the case of the composite plate of embodiment 2 obtained by molding the composite plate of embodiment 1, a sound absorption rate has been improved in all frequency bands, in the intermediate and high frequency bands. The cover plates 120a and 120b are deformed by molding and thus the size of a slit varies. The present deformation randomly occurs, allowing all noises having different frequencies to be effectively absorbed.

In contrast, in the case of embodiment 4 resulting from molding of embodiment 3, a sound absorption rate has decreased, in the intermediate and high frequency bands.

This is because the burr 210 blocks the perforation H in a molding process again. The blocking of the perforation H decreases the total area of the perforation and thus decreases sound permeability, reducing the amount of sound transferred to a sound-absorbing material and resulting in the decreasing of the sound absorption rate.

The present invention has been described with reference to what is considered to be presently practical exemplary embodiments with reference to the accompanying drawings. However, a person skilled in the art, to which the present invention belongs, will be able to understand that the present invention may be conducted in other specific forms without modifying the technical idea and essential feature of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sound-permeable metal plate, which is a plate processed to have concavity and convexity formed thereon, comprising:
    a plurality of cells protruding from the plate; and
    a flat base portion formed between the plurality of cells, wherein each of the cells includes a plurality of wall surface parts, which are bent on and protrude from the base portion, and a cover portion extending from end portions of the wall surface parts, and each of the cells has a straight line-shaped slit formed through the plate,
    wherein the cover portion is formed to be a polygon having edge portions, a number of which is equal to a number of the plurality of wall surface parts configuring each of the cells, and the slit is formed along at least one of the edge portions, and
    wherein at least one of the plurality of wall surface parts configuring each of the cells and the at least one of the edge portions of the cover portion are spaced from each other by slit.

2. The metal plate of claim 1, wherein the plurality of wall surface parts configuring each of the cells are integrally formed to have a shape of a frustum of a polygonal pyramid, in which the farther the wall surface parts are away from the base portion, the closer to each other the wall surface parts become.

3. The metal plate of claim 1, wherein the slit is formed along at most half of edge portions of the cover pan.

4. The metal plate of claim 1, wherein a height from the base portion to the cover portion is at least 25% of the largest width of a bottom surface of each of the cells.

5. The metal plate of claim 1, wherein, in a view oriented perpendicularly to a reference plane in which the base portion is placed, the slit has an area occupying at least 5% of an area of a bottom surface of each of the cells.

6. The metal plate of claim 1, wherein, in a view oriented perpendicularly to a reference plane in which the base portion is disposed, the cover portion has an area occupying at least 30% of an area of a bottom surface of each of the cells.

7. The metal plate of claim 1, wherein the plate includes an aluminum material.

8. A sound-absorbing composite plate, comprising:
    a sound-permeable metal plate which includes a plurality of cells protruding therefrom and a flat base portion formed between the plurality of cells; and
    a sound-absorbing material disposed on one surface side of the sound-permeable metal plate,
    wherein each of the cells includes a plurality of wall surface parts, which are bent on and protrude from the base portion, and a cover portion extending from end portions of the wall surface parts, and each of the cells has a straight line-shaped slit formed through the plate,
    wherein the cover portion is formed to be a polygon having edge portions, a number of which is equal to a number of the plurality of wall surface parts configuring each of cells, and the slit is formed along at least one of the edge portions, and
    wherein at least one of the plurality of wall surface parts configuring each of the cells and the at least one of the edge portions of the cover portion are spaced from each other by the slit.

9. The composite plate of claim 8, wherein the sound-permeable metal plate includes an aluminum material and the sound-absorbing material includes felt including a fiber.

* * * * *